(12) United States Patent
Kaizerman et al.

(10) Patent No.: US 9,858,658 B2
(45) Date of Patent: Jan. 2, 2018

(54) DEFECT CLASSIFICATION USING CAD-BASED CONTEXT ATTRIBUTES

(75) Inventors: Idan Kaizerman, Meitar (IL); Ishai Schwarzband, Or-Yehuda (IL); Efrat Rozenman, Asseret (IL)

(73) Assignee: Applied Materials Israel Ltd, Rehovot (IL)

( * ) Notice: Subject to any disclaimer, the term of this patent is extended or adjusted under 35 U.S.C. 154(b) by 0 days.

(21) Appl. No.: 13/451,486

(22) Filed: Apr. 19, 2012

(65) Prior Publication Data

US 2013/0279790 A1    Oct. 24, 2013

(51) Int. Cl.
*G06T 7/00* (2017.01)

(52) U.S. Cl.
CPC .... *G06T 7/001* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 5,705,301 A * | 1/1998 | Garza | G03F 1/144 430/22 |
| 6,174,738 B1 * | 1/2001 | Steffan et al. | 438/5 |
| 6,288,782 B1 | 9/2001 | Worster et al. | |
| 6,353,222 B1 | 3/2002 | Dotan | |
| 6,373,053 B1 | 4/2002 | Choo | |
| 6,510,730 B1 | 1/2003 | Phan | |
| 6,539,106 B1 * | 3/2003 | Gallarda et al. | 382/149 |
| 6,674,889 B1 * | 1/2004 | Takayama | G01N 21/95607 348/130 |
| 6,724,929 B1 * | 4/2004 | Matsuoka | 382/145 |
| 6,745,372 B2 * | 6/2004 | Cote et al. | 716/52 |
| 6,930,308 B1 | 8/2005 | Lorusso et al. | |
| 6,948,141 B1 * | 9/2005 | Satya et al. | 716/52 |
| 6,987,873 B1 * | 1/2006 | Ben-Porath et al. | 382/145 |
| 7,570,796 B2 | 8/2009 | Zafar et al. | |
| 7,570,800 B2 | 8/2009 | Lin et al. | |
| 7,576,658 B2 | 8/2009 | Ishikawa | |

(Continued)

FOREIGN PATENT DOCUMENTS

| | | |
|---|---|---|
| JP | 2006258516 A | 3/2005 |
| JP | 2010175270 A | 1/2009 |

(Continued)

OTHER PUBLICATIONS

USPTO, Office Action for U.S. Appl. No. 13/451,490, dated Jul. 3, 2013.

(Continued)

*Primary Examiner* — Sumati Lefkowitz
*Assistant Examiner* — Carol Wang
(74) *Attorney, Agent, or Firm* — Lowenstein Sandler LLP (57) ABSTRACT

A method for classification includes receiving an image of an area of a semiconductor wafer on which a pattern has been formed, the area containing an image location of interest, and receiving computer-aided design (CAD) data relating to the pattern comprising a CAD location of interest corresponding to the image location of interest. At least one value for one or more attributes of the image location of interest is computed based on a context of the CAD location of interest with respect to the CAD data.

30 Claims, 6 Drawing Sheets

(56) References Cited

U.S. PATENT DOCUMENTS

| | | |
|---|---|---|
| 7,626,163 B2 | 12/2009 | Honda |
| 7,684,609 B1* | 3/2010 | Toth et al. ............... 382/141 |
| 7,705,304 B2 | 4/2010 | Kawamata et al. |
| 7,756,658 B2 | 7/2010 | Kulkarni et al. |
| 7,760,929 B2* | 7/2010 | Orbon ............... G03F 1/84 382/148 |
| 7,764,826 B2 | 7/2010 | Miyamoto et al. |
| 7,835,564 B2 | 11/2010 | Bearup et al. |
| 8,112,241 B2 | 2/2012 | Xiong |
| 8,175,373 B2 | 5/2012 | Abbott et al. |
| 8,194,968 B2 | 6/2012 | Park et al. |
| 8,315,453 B2 | 11/2012 | Shlain et al. |
| 8,502,146 B2 | 8/2013 | Chen et al. |
| 2001/0042705 A1* | 11/2001 | Nakagaki ......... G01N 21/9501 209/44.4 |
| 2002/0015518 A1* | 2/2002 | Matsuoka ............... 382/145 |
| 2002/0159643 A1* | 10/2002 | DeYong et al. ......... 382/228 |
| 2003/0015659 A1 | 1/2003 | Honda et al. |
| 2004/0008880 A1 | 1/2004 | Horie et al. |
| 2004/0096092 A1* | 5/2004 | Ikeda ............... 382/141 |
| 2004/0147121 A1 | 7/2004 | Nakagaki et al. |
| 2004/0228515 A1* | 11/2004 | Okabe et al. ............. 382/145 |
| 2004/0257587 A1 | 12/2004 | Rosakis |
| 2005/0004774 A1* | 1/2005 | Volk et al. ............. 702/108 |
| 2005/0031186 A1* | 2/2005 | Luu et al. ............... 382/141 |
| 2005/0069192 A1 | 3/2005 | Roman et al. |
| 2005/0100205 A1 | 5/2005 | Shishido et al. |
| 2005/0147287 A1* | 7/2005 | Sakai et al. ............. 382/141 |
| 2005/0198602 A1* | 9/2005 | Brankner ............... 716/8 |
| 2006/0038817 A1 | 2/2006 | Langer |
| 2006/0078188 A1* | 4/2006 | Kurihara et al. .......... 382/149 |
| 2006/0110009 A1 | 5/2006 | Klassen |
| 2006/0210143 A1 | 9/2006 | Miyamoto et al. |
| 2006/0269120 A1* | 11/2006 | Nehmadi ............ G03F 7/7065 382/145 |
| 2007/0053580 A1* | 3/2007 | Ishikawa ............... 382/149 |
| 2007/0104357 A1 | 5/2007 | Worster |
| 2007/0201739 A1* | 8/2007 | Nakagaki ......... G06K 9/6256 382/149 |
| 2007/0288219 A1* | 12/2007 | Zafar et al. ............. 703/14 |
| 2008/0016481 A1* | 1/2008 | Matsuoka ......... G06F 17/5081 716/52 |
| 2008/0058977 A1* | 3/2008 | Honda ............... G03F 1/86 700/110 |
| 2008/0081385 A1* | 4/2008 | Marella et al. ............. 438/14 |
| 2008/0283747 A1 | 11/2008 | Kawamata et al. |
| 2008/0290274 A1 | 11/2008 | Honda |
| 2008/0295048 A1* | 11/2008 | Nehmadi ......... G01B 31/31851 716/136 |
| 2009/0098472 A1* | 4/2009 | Morishita ............ G03F 1/84 430/30 |
| 2009/0114816 A1 | 5/2009 | Tam et al. |
| 2009/0180680 A1* | 7/2009 | Satou ............... G06T 7/001 382/144 |
| 2010/0111416 A1 | 5/2010 | Meiers |
| 2010/0157312 A1 | 6/2010 | Van Amstel et al. |
| 2010/0189339 A1 | 7/2010 | Amanullah et al. |
| 2011/0082650 A1 | 4/2011 | Leu |
| 2011/0176718 A1 | 7/2011 | Momonoi et al. |
| 2011/0242312 A1 | 10/2011 | Seki et al. |
| 2011/0280470 A1* | 11/2011 | Hayashi ............ G01N 21/9505 382/149 |
| 2011/0296362 A1* | 12/2011 | Ishikawa ............ G06T 7/001 716/112 |
| 2012/0027285 A1 | 2/2012 | Shlain et al. |
| 2012/0131529 A1* | 5/2012 | Hayakawa ....... G01N 21/95607 716/112 |
| 2013/0200255 A1 | 8/2013 | Schwarzband et al. |
| 2013/0279790 A1 | 10/2013 | Kaizerman et al. |
| 2013/0279791 A1 | 10/2013 | Kaizerman et al. |
| 2013/0304399 A1 | 11/2013 | Chen et al. |
| 2013/0318485 A1 | 11/2013 | Park et al. |
| 2014/0050389 A1 | 2/2014 | Mahadevan et al. |
| 2015/0241210 A1 | 8/2015 | Rakos |

FOREIGN PATENT DOCUMENTS

| | | |
|---|---|---|
| JP | 2011033423 A | 7/2009 |
| JP | 2011211035 A | 3/2010 |
| WO | 2011004534 A1 | 5/2010 |
| WO | WO2013/140302 A1 | 9/2013 |
| WO | WO2013/169770 A1 | 11/2013 |

OTHER PUBLICATIONS

Serulnik et al. "Automatic defect classification using topography map from SEM photometric stereo". Proc. SPIE 5378, Data Analysis and Modeling for Process Control, 124 (Apr. 29, 2004).

USPTO, Office Action for U.S. Appl. No. 13/451,490, dated Dec. 26, 2013.

Ohtake et al., "Ridge-Valley Lines on Meshes via Implicit Surface Fitting. In ACM Transactions on Graphics (TOG), vol. 23, No. 3, pp. 609-612. ACM, 2004."

* cited by examiner

DEFECT CLASSIFICATION USING CAD-BASED CONTEXT ATTRIBUTES

RELATED APPLICATIONS

The present application is related to Ser. No. 13/451,490, entitled "Defect Classification Using Topographical Attributes", filed on Apr. 19, 2012, which is incorporated herein by reference.

FIELD OF THE INVENTION

Embodiments of the present invention relate generally to automated inspection, and specifically, to a technique for analysis of manufacturing defects.

BACKGROUND OF THE INVENTION

Automatic Defect Classification (ADC) techniques are widely used in inspection and measurement of defects on patterned wafers in the semiconductor industry. ADC techniques detect the existence of defects, as well as automatically classify the defects by type in order to provide more detailed feedback on the production process and to reduce the load on human inspectors. ADC techniques are used, for example, to distinguish among types of defects arising from particulate contaminants on a wafer surface and defects associated with irregularities in the microcircuit pattern itself, and may also identify specific types of particles and irregularities.

Current approaches of defect classification use computer-aided design (CAD) data together with images of a semiconductor device under inspection. For example, U.S. Pat. No. 7,626,163 describes a defect review method in which a scanning electron microscope (SEM) image is derived by capturing an image of a process-margin-narrow pattern portion extracted based on lithography simulation with image-capturing conditions of a relatively low resolution. The resulting SEM image is compared with CAD data for extraction of any abnormal section. An image of the area extracted as being abnormal is captured again, and the resulting high-resolution SEM image is compared again with the CAD data for defect classification based on the feature amount of the image, such as shape deformation.

A number of techniques are known in the art for three-dimensional (3D) mapping of samples using SEM images. For example, U.S. Pat. No. 6,930,308, which is hereby incorporated by reference, describes a technique for inspecting semiconductor devices. The technique utilizes multiple sets of measurement data obtained by a SEM to determine the dimensional parameters of a semiconductor device. The SEM collects each set of data from a different angular orientation with respect to the device. The dimensional parameters of the semiconductor device are determined by analyzing the relationship between the SEM inspection angle and the collected data sets.

As another example, U.S. Pat. No. 7,705,304, which is hereby incorporated by reference, describes a 3D shape measurement in which detection signals from respective semiconductor elements are sequentially switched in synchronization with a scanning frame of an electron beam on a sample. The detection signals from the respective semiconductor elements can be sequentially recorded in recording addresses in a frame memory that correspond to the respective semiconductor elements. After four electron beam scanning sessions, each image data for 3D shape measurement is recorded in the frame memory, and processed for 3D shape measurement.

SUMMARY

Embodiments of the present invention provide improved methods, systems and software for automated classification of defects based on inspection data. An exemplary image processing system receives an image of an area of a semiconductor wafer on which a pattern has been formed, the area containing an image location of interest. The image processing system receives computer-aided design (CAD) data relating to the pattern containing a CAD location of interest corresponding to the image location of interest. The image processing system computes at least one value for one or more attributes of the image location of interest based on a context of the CAD location of interest with respect to the CAD data.

In one embodiment, the image location of interest contains at least one feature, the at least one feature selected from a group of features consisting of a defect, a process variation, and a design of interest.

In one embodiment, the image processing system automatically classifies the defect at the image location of interest based on the values of the one or more attributes.

In one embodiment, the image processing system receives the image captured by a scanning electron microscope (SEM).

In one embodiment, the image processing system computes the at least one value by accepting a definition from a user of an attribute relating to a spatial relation between the image location of interest and one or more functional segments identified by the CAD data.

In one embodiment, the image processing system computes the at least one value by calculating a value of an attribute of a segment in the CAD data.

In one embodiment, the segment in the CAD data may include at least one of a portion relating to a first layer corresponding to the pattern, a portion relating to a second layer, wherein the second layer is different than the first layer corresponding to the pattern, and a plurality of data elements corresponding to one or more locations that are outside a field of view (FOV) of the image.

In one embodiment, the image processing system applies one or more labels to pixels in the image, the pixels corresponding to the segments in the CAD data, and the image processing system computes the at least one value by selecting one or more of the pixels based upon the labels and calculates the at least one value of the attributes for the selected pixels.

In one embodiment, the image processing system computes the plurality of values by calculating a value of an attribute based on the spatial relation between the image location of interest and a multi-layer structure defined by the CAD data.

In one embodiment, the image processing system computes the at least one value by measuring an overlap between a defect in the image location of interest and one or more elements of the pattern.

In one embodiment, the image processing system measures the overlap by assessing an area of the overlap between the defect and at least one element of the pattern.

In one embodiment, the image processing system measures the overlap by assessing a number of overlaps between the defect and the elements of the pattern.

In one embodiments, the image processing system computes the at least one value by measuring a proximity between a defect in the image location of interest and one or more elements of the pattern. In one embodiment, the image processing system computes the at least one value by estimating, based on the proximity, a likelihood that the defect bridges two of the elements of the pattern and/or identifying a segment of the pattern that is nearest to the defect.

In one embodiment, the image processing system computes the at least one value by comparing a gray level of the image location of interest to respective gray levels of one or more elements of the pattern.

In one embodiment, the image processing system computes the at least one value by calculating a value of an attribute based on a plurality of features of the semiconductor wafer, wherein the plurality of features are invisible in the image and are evident in the CAD data. The features may be outside a field of view of the image or in an underlying layer below a surface of the wafer.

In one embodiment, the image processing system receives a three-dimensional (3D) map of the area, and computes one or more topographical attribute values of the defect based upon a plurality of topographical features of the defect in the 3D map, wherein the image processing system automatically classifies the defect by applying the one or more topographical attribute values in classifying the defect.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Automatic defect classification (ADC) systems process inspection data, such as images of a patterned semiconductor wafer, to identify defects and compute values of attributes of the defects, such as their shape and size, and map the defects to a multi-dimensional attribute hyper-space based on these attribute values. Automatic classifiers learn the bounds of each defect class within this hyper-space and assign defects to classes accordingly. A system of this sort is described, for example, in U.S. patent application Ser. No. 12/844,724, filed Jul. 27, 2010, entitled "Defect Classification with Optimized Purity," which is hereby incorporated by reference.

CAD-based context attributes and topography attributes provide additional information on defects, thus facilitating better characterization of certain defect types, such as particles, flakes, bumps and craters, etc. Therefore, embodiments of the present invention provide new types of defect attributes relating to the 3D shape, texture and context of the defects as they appear in images captured by an inspection system, such as a SEM (or other representations based on these images). The disclosed embodiments may relate to defects on semiconductor wafers, but attributes of these types may similarly be used in classifying defects appearing on semiconductor masks or samples of other kinds. The term "inspection" is used broadly in the present patent application to refer to any sort of data capture that can provide information useful in detecting and classifying defects, whether the data is captured over the entire wafer or in individual locations.

Embodiments of the present invention are applicable to the analysis of defects identified by an inspection system that scans a wafer or mask and provides a list of locations of suspected defects. Some embodiments are applicable to the analysis of defects that are re-detected by a review tool based on locations of suspected defects provided by an inspection tool. The invention is not limited by the technology by which the inspection data is generated. Thus, for semiconductor applications, embodiments of the invention may be applied to analysis of data generated by an optical inspection system such as the UVision™ system or Aera™ system, or by a review system such as SEMVision™ system (commercially available from Applied Materials Inc.), or by any other sort of inspection system or modality that is known in the art.

In embodiments of the present invention that are described herein, an image processing system receives an image of an area of a semiconductor wafer on which a pattern has been formed. The area can contain an image location of interest. The location typically contains at least one feature of interest, such as a defect, a process variation, or a design of interest. Although the embodiments described below relate mainly to classifying images of defects, the present invention may similarly be applied in computing attributes of other features of interest. The system also receives computer-aided design (CAD) data relating to the pattern. The CAD data can contain a CAD location of interest corresponding to the image location of interest. The system computes at least one value of one or more attributes of the image location of interest based upon the context of the CAD location of interest with respect to the CAD data. In some embodiments, an ADC system receives an image of an area of a patterned wafer containing a defect, which is registered with computer-aided design (CAD) data relating to the pattern in the same area. The image and CAD data may be registered by the ADC system itself, or they may be pre-registered by another image processing unit using any suitable method of registration known in the art. The area (or a specific location within the area) is typically considered to contain a defect because initial inspection readings indicate some sort of abnormality in the area or location. The classification of the defect, however, may not yet be ascertained at this stage (and it may ultimately be determined that despite the abnormality, the part of the pattern in the area in question is not defective). A defect may refer to abnormal inspection data received from a given area or location of the wafer that may be indicative of an irregularity in the area.

The ADC system uses the CAD data in computing values of one or more attributes of the defect based on the context of the defect with respect to the registered pattern. Registering the image with CAD data facilitates segmentation of the image, enabling the ADC system to identify specific structures in the pattern, such as contact pads and lines. The system may then compute attribute values of the defect that indicate whether it overlaps parts of the pattern, which particular parts overlap, and the extent of overlap. Other types of context-based attributes may indicate, for example, the number of intersections between a defect and certain pattern or background shapes, as well as the probability that a defect bridges separate patterns or background shapes.

The ADC system may use the CAD data in calculating attributes for features that are invisible in the image but are evident in the CAD data. Such attributes may be derived, for example, from Z-axis analysis, in which a certain defect is analyzed with respect to the underlying layers below it. The underlying-layer information is typically invisible in the image but is available in the CAD data.

The ADC system may use the CAD data for out-of-FOV (field of view) analysis, using structures that are outside the area of the inspection image containing the defect of interest. In such cases, a defect could produce short circuits or bridges between pattern elements may not visible in the image but may be evident in the CAD data. Out-of-FOV analysis may thus be used to compute bridging or other attributes based on the CAD data.

CAD data may also be used, for example, to compute attributes based on the proximity of a defect to specific CAD elements or combinations of specific structures. These CAD structures may be defined (by an operator, for example) by exploiting prior knowledge of highly-sensitive areas in the wafer, which are more important or prone to defects. The purpose of such attributes may be to accurately measure the proximity of the defect to these specific elements or structures.

The ADC system may compute attribute values based upon topographical features of defects that it derives from a three-dimensional (3D) map of an area of the wafer. In some embodiments, the attributes relate to the shape and size of a given defect in the X and Y directions of the image plane. In some embodiments, the attributes further relate to the shape and size of a given defect in the height (Z) direction. This height information may be provided by 3D mapping using SEM images, as described, for example, in the references cited above or as described in U.S. patent application Ser. No. 13/365,238, filed Feb. 2, 2012, entitled "Three-Dimensional Mapping Using Scanning Electron Microscope Images," which is hereby incorporated by reference. The topographical features may be related, for example, to the 3D shape and/or texture of the defect.

Figure 1:
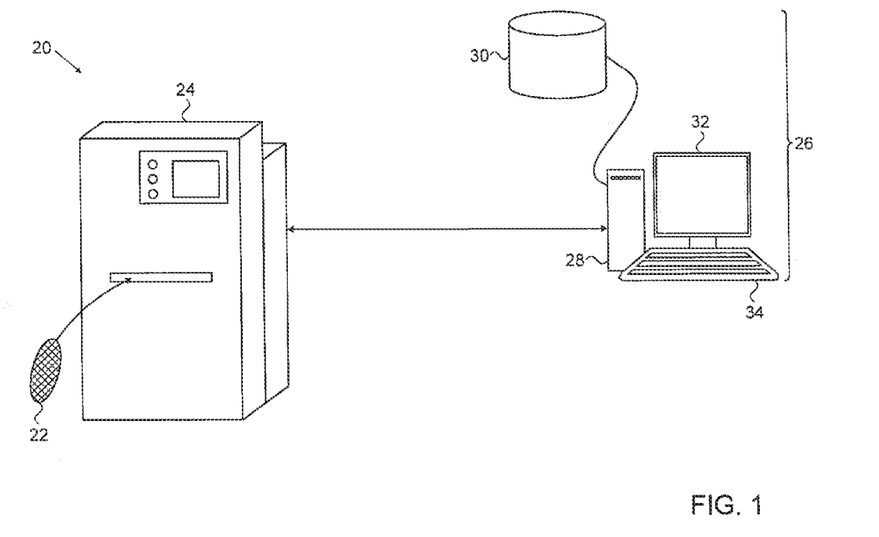
FIG. 1 is an exemplary schematic illustration of a defect inspection and classification system, in accordance with an embodiment of the present invention.

FIG. 1 is an exemplary schematic, pictorial illustration of a system 20 for automated defect inspection and classification, in accordance with an embodiment of the present invention. A sample, such as a patterned semiconductor wafer 22 (or a mask or reticle), is inserted into an inspection machine 24. Machine 24 may comprise, for example, a scanning electron microscope (SEM) or an optical inspection device or any other suitable sort of inspection apparatus that is known in the art. In some embodiments, machine 24 may be configured to generate two-dimensional images of wafer 22. In some embodiments, machine 24 may be configured to generate 3D maps of wafer 22, as described in the references cited above.

In the following, for ease of explanation, an ADC machine 26 will be described as a stand-alone system, connectable to an inspection system (such as machine 24) either directly or indirectly, via a network, a cloud or via an intermediate system. It should be understood, however, that an embodiment of the invention could be implemented as a module hosted on or integrated with the inspection system (such as machine 24).

Machine 24 can scan the surface of wafer 22 (or a certain portion or portions of the surface of wafer 22), can sense and process the scan results, and can output inspection data, comprising images and/or 3D maps of areas containing defects on wafer 22. The inspection data may include a list of defects found on the wafer, and the location of each defect, along with values of inspection features associated with each defect. The inspection features may include, for example, the size, shape, scattering intensity, directionality, and/or spectral qualities, as well as any other suitable features known in the art. Although the term "inspection data" is used in the present embodiment to refer to SEM images and associated metadata, this term should be understood more broadly to refer to any and all sorts of descriptive and/or diagnostic data that can be collected and processed to identify features of defects, regardless of the means used to collect the data.

ADC machine 26 can obtain and process the inspection data outputted by machine 24. If machine 24 does not extract all relevant defect attribute values from the images of wafer 22, the ADC machine 26 may perform these image processing functions. Although ADC machine 26 is shown in FIG. 1 as being connected directly to the inspection machine output, the ADC machine 26 may obtain pre-acquired, stored inspection data. In one embodiment, the functionality of ADC machine 26 is integrated into machine 24.

In one embodiment, machine 24 transmits the inspection data to a 3D map generator (not shown), which generates 3D maps that are then received by ADC machine 26. The 3D map generator can be a stand-alone system or a system hosted by or integrated with ADC machine 26.

ADC machine 26 may be a general-purpose computer, comprising a processor 28 with a memory 30 for holding defect information and classification parameters, along with a user interface comprising a display 32 and input device 34. The computer implementing the functions of ADC machine 26 may be dedicated to ADC functions, or it may perform additional computing functions, as well. In one embodiment, at least some of the ADC functions described herein are performed by dedicated or programmable hardware logic.

After extracting the relevant attribute values from the inspection data, ADC machine 26 attempts to assign each defect to one of a list of predefined classes. For this purpose, ADC machine 26 may run multiple classifiers, including both single-class and multi-class classifiers, as described in the above-referenced U.S. patent application Ser. No. 12/844,724. Defects that cannot be classified by the ADC machine 26 with a sufficient level of confidence may be outputted to a human inspector for visual classification or passed to another inspection modality to provide further classification results. The embodiments that follow will be described, for the sake of illustration and clarity, with reference to ADC machine 26 and the other elements of system 20, but the principles of these embodiments may likewise be implemented in any classification system that computes and uses attribute values in defect classification.

Figure 2A:
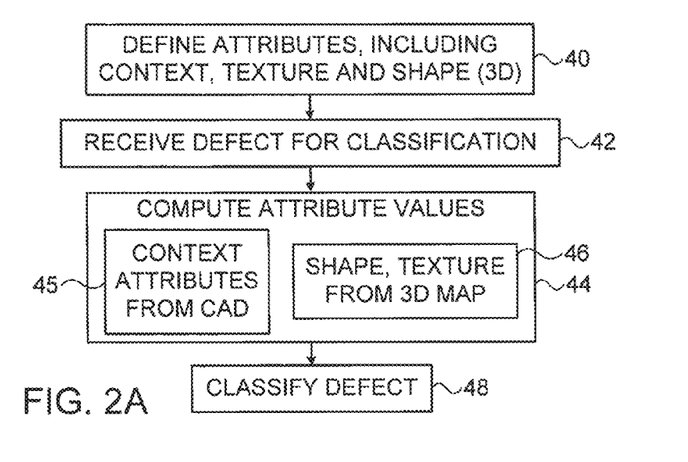
FIGS. 2A-2C are flow diagrams illustrating embodiments of methods for automatic defect classification (ADC), in accordance with an embodiment of the present invention.

FIG. 2A is a flow diagram of an embodiment of a method for ADC. The method of FIG. 2A is performed by processing logic that may comprise hardware (circuitry, dedicated logic, etc.), software (such as is run on a general purpose computer system or a dedicated machine), or a combination of both. In one embodiment, the method of FIG. 2A is performed by ADC machine 26 of FIG. 1.

At block 40, processing logic receives definitions of the defect attributes whose values are to be computed. The defect attributes may be defined by an operator or user of an ADC machine and may be changed, supplemented or adjusted based on the types of defects that are of interest and on empirical experience. The attributes may include, CAD-related context attributes, texture attributes, 3D shape attributes, etc.

CAD-related context attributes can include overlap percentage, number of overlap layers, relative mean gray level (GL), intersection, bridging, nearest segment, nearest segment distance, etc. The overlap percentage context attribute can define the overlap percentage between a defect and various layer segments. For example, an overlap percentage context attribute value of 0 may mean that the defect and various layer segments are non-overlapping and an overlap percentage context attribute value of 1 may mean that the defect and various layer segments are fully overlapping. The number of overlap layers context attribute can define the number of layers significantly overlapping with the defect. The relative mean GL context attribute can define the difference between the mean gray levels of SEM images of various layer segments to the defect. The intersection context attribute can define the number of intersections between the defect and various layer segments. The bridging context attribute can define the probability that the defect bridges different layer segments. The nearest segment context attribute can include a label of the nearest segment to the defect mask. The nearest segment distance attribute can define the distance to the nearest segment (e.g., in nanometers).

Texture attributes can include topographical mean gradient, gradient density, 2D index, pattern direction, RMS polynomial fit, etc. The topographical mean gradient texture attribute can define the mean topographical gradient magnitude on the defect mask. The gradient density texture attribute can define the density of pixels having high topographical gradient magnitude on the defect mask. The 2D index texture attribute can define an order (edges oriented in the same direction) or disorder of the texture in the defect area or how close (e.g., distance to) the defect surface is to 1D. For example, a value of 1 for the 2D index texture attribute can mean that the defect is isotropic or 2D, whereas a lower value for the 2D index texture attribute can mean that the defect is 1D. The pattern direction texture attribute can define the direction of minimal variation of the defect surface. The RMS polynomial fit texture attribute can define the mean local variation of topographical defect surface that is remaining after polynomial fitting.

3D shape attributes can include X orientation, Y orientation, maximum curvature, mean curvature, ridge valley orientation, crater bump from polynomial fit, crater bump from topography, etc. The X orientation 3D shape attribute can define the X-component of the topographical slope of the defect based on polynomial fitting. The Y orientation 3D shape attribute can define the Y-component of the topographical slope of the defect based on polynomial fitting. The maximum curvature 3D shape attribute can define the maximum 3D curvature of the topographical defect surface based on polynomial fitting. The mean curvature 3D shape attribute can define the mean 3D curvature of the topographical defect surface based on polynomial fitting. The ridge valley orientation 3D shape attribute can define the orientation of the ridge of the topographical defect surface based on polynomial fitting. The crater bump from polynomial fit 3D shape attribute can define whether a crater bump for the defect is concave or convex. The crater bump from topography 3D shape attribute can define the difference in mean height of the defect and an environment of the defect (e.g., as measured in pixels).

At block 42, processing logic receives inspection data (from inspection machine 24, for example) for the defects that are to be classified. In some embodiments, the inspection data include images of the defects, and may include 3D images corresponding to parts of a 3D map. In some embodiments, the images are SEM images. In alternate embodiments, the images are other types of images, such as optical images (assuming the defects and other image features to be of a size that is amenable to optical imaging).

At block 44, processing logic computes attribute values for each defect. Processing logic can compute the attribute values using various image processing operations, some of which are known in the art. The attribute values can be calculated for attributes such as context-related attributes, 3D shape attributes, and texture attributes. In some embodiments, a vector of attribute values is generated for each defect from the computed attribute values for each defect. The vector of attribute values may map the defect to a location in an attribute hyper-space.

At block 45, processing logic computes the attribute values for context-related attributes by registering the pattern of shapes appearing in input images with corresponding shapes in CAD data that were used in producing the pattern. Embodiments of computing the attribute values for context-related attributes is described in greater detail below in conjunction with FIGS. 4 and 5.

At block 46, processing logic computes the attribute values for 3D shape and texture attributes from a 3D map of the area of the defect. The 3D map may be derived from SEM data, as explained above. Embodiments of computing the attribute values for 3D shape and texture attributes is described in greater detail below in conjunction with FIGS. 3A and 3B.

At block 48, processing logic classifies each defect based on the vector of attribute values for the defect. In one embodiment, processing logic automatically assigns each defect to a certain class. In one embodiment, when the automatic classification is uncertain, processing logic passes the defects to a human inspector.

Figure 2B:
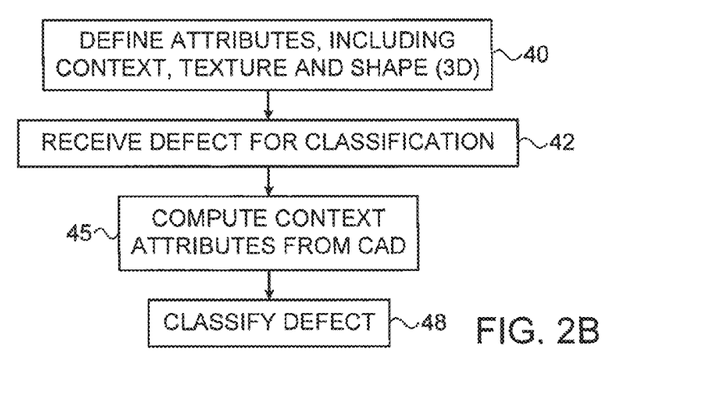
Figure 2C:
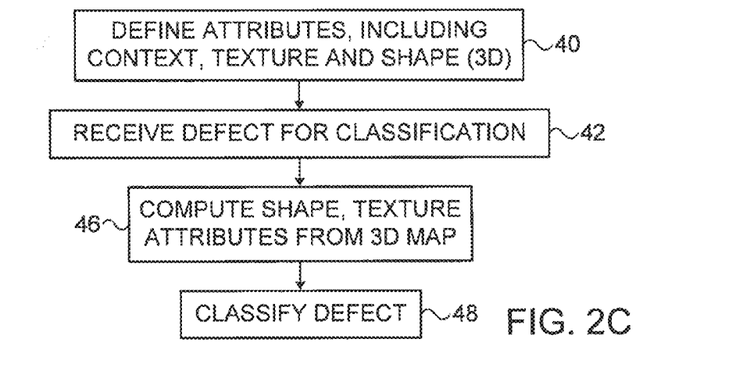

FIG. 2B and FIG. 2C are flow diagrams that schematically illustrate methods for ADC, in accordance with alternative embodiments of the present invention. The methods of FIGS. 2B and 2C are performed by processing logic that may comprise hardware (circuitry, dedicated logic, etc.), software (such as is run on a general purpose computer system or a dedicated machine), or a combination of both. In one embodiment, the method of FIG. 2B is performed by ADC machine 26 of FIG. 1. In one embodiment, the method of FIG. 2C is performed by ADC machine 26 of FIG. 1. In FIG. 2B, only context-related attributes (as described above in block 45 of FIG. 2A) are used in classifying defects. In FIG. 2C, only shape and texture attributes (as described above in step 46 of FIG. 2A) are used. These alternative embodiments demonstrate that the attributes computed in steps 45 and 46 may be derived and applied independently of one another.

Figure 3A:
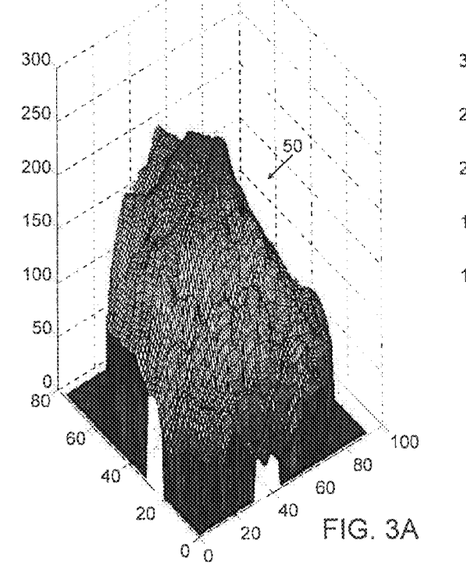
FIG. 3A is a schematic representation of a SEM-based height map of a defect, in accordance with an embodiment of the present invention.
Figure 3B:
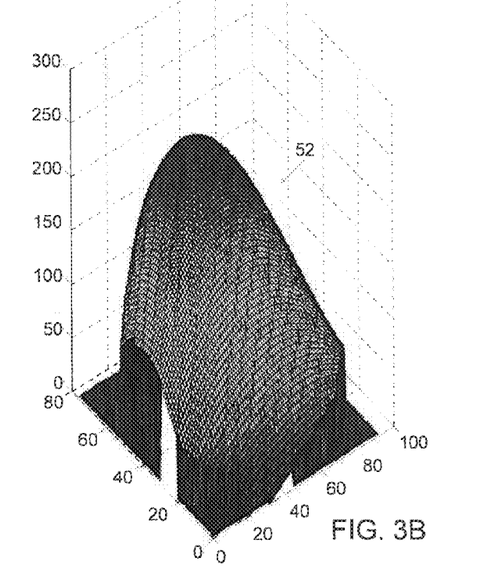
FIG. 3B is a schematic representation of a polynomial fit to the height map of FIG. 3A, in accordance with an embodiment of the present invention.

FIG. 3A illustrates an exemplary 3D map of a defect on a semiconductor wafer. FIG. 3B illustrates a polynomial surface that is fitted to a 3D map of a defect on a semiconductor wafer. Referring to FIG. 3A, map 50 can be computed from SEM data, as explained above. Referring to FIG. 3B, surface 52 is defined by a third-order polynomial, of the general form $$f(x, y) = \sum_{i=0}^{n} c_i \phi_i(x, y),$$

whose coefficients Ci are computed by least-squares fitting to map 50. In one embodiment, ADC machine 26 may fit the coefficients of a sequence of products of Legendre polynomials $P_{NM}(x,y)=P_{n-m}(x)P_m(y)$ to give the parametric surface. In alternate embodiments, other types of parametric surfaces, including both polynomials (of any order) and other functional types, may be fitted to the map. In some embodiments, other methods of surface analysis, as are known in the art, may be used to extract the surface parameters.

Surface 52 can be defined using three components:

$S=P+I+L$, where

Plane (P),
Integral non-planarity (I), and
Local non-planarity (L).

The plane component defines integral 3D orientation, which can be used to measure the X orientation 3D shape attribute and the Y orientation 3D shape attribute. These attributes may be used, for example, to identify flake-shaped defects that bridge between elements of the pattern on the wafer and distinguish between the pattern and particles.

Integral non-planarity defines the overall topographical shape, and can be used to define the maximum curvature 3D shape attribute, the mean curvature 3D shape attribute, the ridge valley orientation 3D shape attribute, the crater bump from polynomial fit 3D shape attributes, and the crater bump from topography 3D shape attribute. The integral non-planarity includes information such as convexity or concavity of the topographical shape, as well as the magnitude (radii of curvature) and orientation of the axes of curvature. These features may be used, for example, to distinguish between bumps and craters, and between flakes and more rounded particles.

Local non-planarity defines topological roughness and other texture-related attributes and can be used to determine the texture attributes. In some embodiments, the non-planarity is calculated from the difference between the actual defect surface (map 50) and the fitted surface (surface 52). The mean magnitude of the surface gradient can be used to define the topographical mean gradient texture attribute. The gradient density (number of pixels classified as edges) over the area of a defect can be used to define the gradient density texture attribute. The texture attributes can be used to provide information on the defect type and composition. A 2D index texture attribute can be computed to measure the order (edges oriented in the same direction) or disorder of the texture in the defect area.

Figure 4:
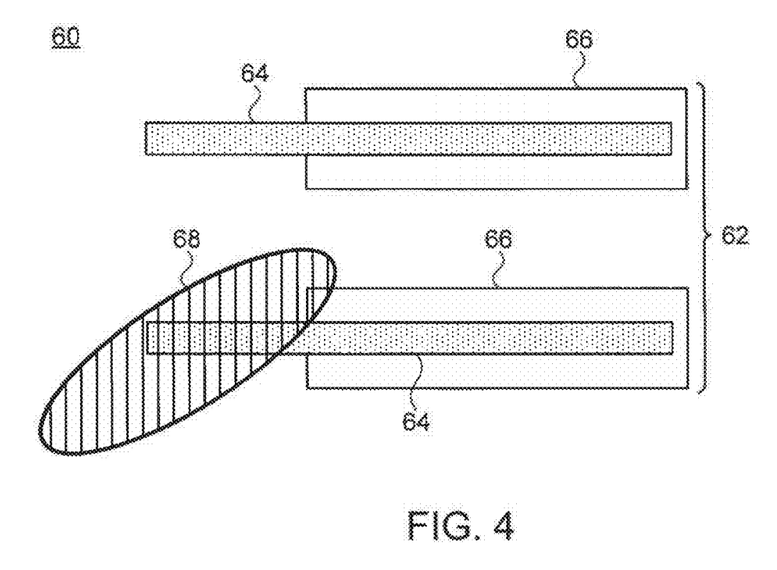
FIGS. 4 and 5 are schematic views of defects overlapping patterns on a semiconductor wafer, in accordance with embodiments of the present invention.

FIG. 4 illustrates an exemplary schematic top view of a defect. Defect 68 overlaps a pattern 62 on a semiconductor wafer 60, illustrating computation of defect context attributes. The pattern 62 includes functional surface elements, such as conducting lines, referred to as primary pattern segments 64, and underlying pattern components, referred to as secondary pattern segments 66. In some embodiments, an ADC machine (e.g., ADC machine 26 of FIG. 1) identifies these pattern segments by registering an image of the wafer surface, such as a SEM image, with corresponding CAD data that defines the layout of the pattern, as described above, and then segmenting the image accordingly. The CAD data provides additional functional information regarding each pattern segment in the segmented SEM image, which can be exploited by the ADC user in defining specific attributes that characterize defect types by their spatial relation with these functional patterns.

Automated or manual defect detection procedure can identify the area covered by defect 68, which is referred to as the "defect mask." The ADC machine can then derive values of context-based attributes from the spatial relationships between the defects and the nearby pattern segments. In one embodiment, the ADC machine computes an overlap percentage context attribute, which measures the extent to which defect 68 overlaps primary and secondary pattern segments 64 and 66, as opposed to non-pattern (background) areas of wafer 60. For example, defect 68 may overlap primary pattern segment 64 by 0.3 nanometers, defect 68 may overlap secondary pattern segment 66 by 0.1 nanometers, and defect 68 may overlap the background areas of wafer 60 by 0.6 nanometers. In one embodiment, the ADC machine measures the number of overlap layers context attribute by measuring the number of different layers overlapped by the defect. For example, the number of overlap layers for defect 68 is three layers: primary pattern segment 64, secondary pattern segment 66, and background areas of wafer 60.

The ADC machine may also compute a relative mean GL context attribute. The relative mean GL context attribute value may be computed based on the gray level (GL) of the defect relative to the pattern context. In one embodiment, for each defect, the ADC machine may compute a vector of three elements, each corresponding to the difference between the defect mean gray level and the mean gray level of each pattern or background segment in the image. For example, the vector may include the difference between the defect mean gray level and the mean gray level for primary pattern segment 64, secondary pattern segment 66, and background areas of wafer 60. In one embodiment, the vector is computed using the formula: $d_i = \mu_{Defect} - \mu_i$, for i=1, 2, 3, wherein μ represents the average gray level for segment i.

More generally speaking, the ADC machine may calculate a value of any attribute of a segment in the CAD data. The segment in the CAD data may include a portion relating to a layer, corresponding to the pattern, or a portion relating to a another layer, other than the layer corresponding to the pattern, as well as data elements corresponding to one or more locations that are outside a field of view (FOV) of the image, as described below in conjunction with FIGS. 6A, 6B, 7, and 8. In some embodiments, the ADC machine may apply one or more labels to pixels in the image corresponding to the segments in the CAD data, and may then select one or more of the pixels based upon the labels and calculate respective values of certain attributes for the selected pixels.

Figure 5:
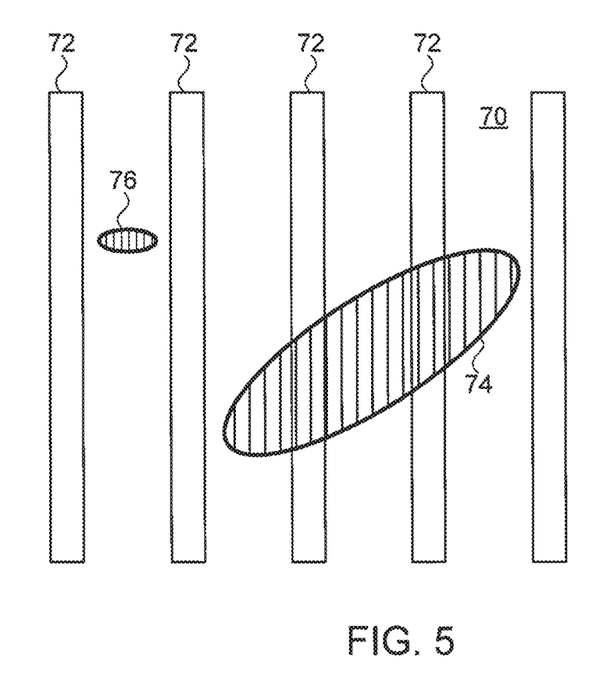

FIG. 5 illustrates an exemplary schematic top view of defects 74 and 76 that overlap pattern segments 72 on a semiconductor wafer 70, illustrating computation of other defect context attributes, in accordance with further embodiments of the present invention. The intersection context attribute is the number of intersections of a defect with pattern segments 72. In this example, defect 74 has an intersection context attribute value of two because it intersects two pattern segments 72, while defect 76 has an intersection context attribute value of zero because it does not intersect any pattern segments 72.

Other context attributes may be related to the distance between a defect and elements of the pattern. In one embodiment, the ADC machine determines the bridging context attribute by computing the probability that a defect bridges two pattern segments, and is thus liable to cause a short-circuit. For defect 74, the value of the bridging context attribute is one (or nearly one) because defect 74 crosses two of pattern segments 72. In one embodiment, the ADC machine determines the bridging context attribute for smaller defects by computing the probability as a function of the distance (typically in nanometers) between the edges of the defect and the adjacent pattern edges. In this embodiment, the larger the distance, the smaller the probability of bridging. For example, the bridging context attribute for defect 76 may be close to one for the pattern segment 72 to the right of defect 76 because the distance between the edge of defect 76 and the edge of pattern segment 72 is close. However, in this example, the bridging context attribute for defect 76 may be close to zero for the pattern segment 72 to the left of defect 76 because the distance between the edge of defect 76 and the edge of pattern segment 72 is not close.

Figure 6A:
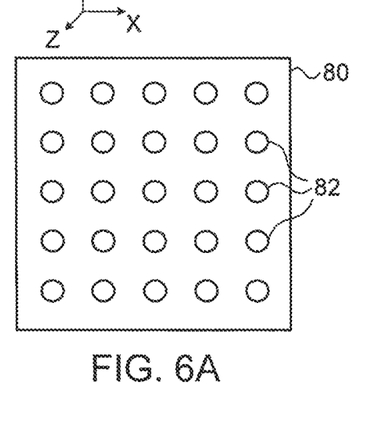
FIG. 6A is a schematic top view of a pattern formed on a semiconductor wafer.
Figure 6B:
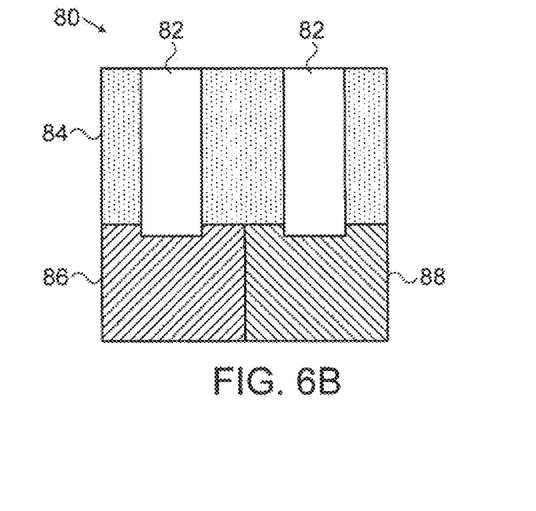
FIG. 6B is a schematic view of the wafer of FIG. 6A, in accordance with an embodiment of the present invention.

The ADC machine can determine the nearest segment context attribute using the type of pattern segment that is nearest to the defect. The nearest segment distance context attribute measures the distance from the defect to the pattern segment. Reference is now made to FIGS. 6A and 6B, which schematically illustrate an embodiment of a method for using CAD data in computing defect attributes based on features that are not visible in an image of a given area, in accordance with an embodiment of the present invention. For the purposes of illustrating this method, FIG. 6A is a schematic top view of a pattern of contact holes 82 formed on a semiconductor wafer 80. FIG. 6B is a schematic sectional view of a part of wafer 80, showing an association between the pattern and underlying structures on the wafer. Specifically, of the two contact holes 82 in an upper layer 84 of wafer 80, the hole on the left side accesses a first underlying structure 86, while the hole on the right side accesses a different underlying structure 88.

The layers beneath the surface of wafer 80 are not visible in the top view shown in FIG. 6A, which is the sort of view that is typically provided in images produced by an optical or SEM inspection machine. Therefore, if a defect is observed in such an image inside or near one of contact holes 82, it is not possible to determine from the image what underlying structure this particular hole is to contact. The missing information, as presented in FIG. 6B, is derived by the ADC machine from CAD data, which includes both upper layer 84 and underlying structures 86 and 88: Once the inspection image and the CAD data have been registered, the CAD data can indicate whether the contact hole where the defect is observed communicates with underlying structure 86 or 88. Thus, the ADC machine can compute an attribute of the defect based on structures below the surface of wafer 80 that are invisible in the actual image in which the defect is identified.

Figure 7:
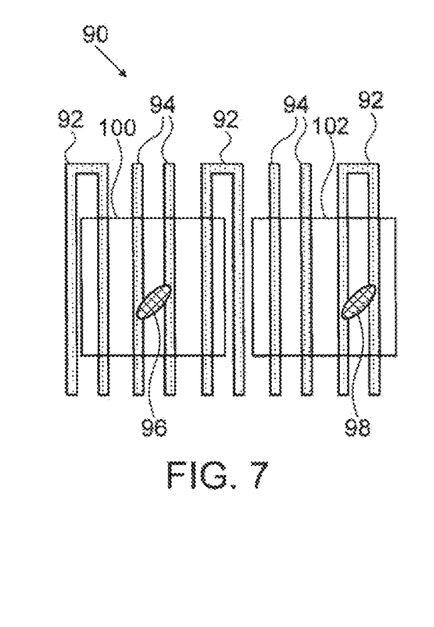
FIG. 7 is a schematic view of defects overlapping different elements of a pattern on a semiconductor wafer, in accordance with an embodiment of the present invention.

FIG. 7 is an exemplary schematic top view of a pattern of lines 92 and 94 on a semiconductor wafer 90, showing defects 96 and 98 overlapping different elements of the pattern of lines 92 and 94, in accordance with an embodiment of the present invention. Lines 92 are interconnected, while lines 94 are mutually independent. An inspection machine captures images of areas of the wafer surface, such as areas 100 and 102. Within these images, lines 92 and 94 are substantially indistinguishable because it is not possible from the images alone to determine which lines are interconnected and which are independent. The connections of lines 92 are not visible in the inspection data, since they are outside the fields of view (FOV) of the images of areas 100 and 102.

Registered CAD data covers the areas of wafer 90 outside the images of areas 100 and 102. Therefore, the ADC machine uses the CAD data to distinguish between lines 92 and 94 appearing in the images and in computing attributes of defects 96 and 98. For example, a bridging attribute will identify defect 96 as a bridge between different circuit elements, since the defect bridges two independent lines 94. In this example, a bridging attribute of defect 98 will have a value of non-bridging (e.g., close to 0), since the lines 92 that defect 98 crosses are structurally interconnected.

Figure 8:
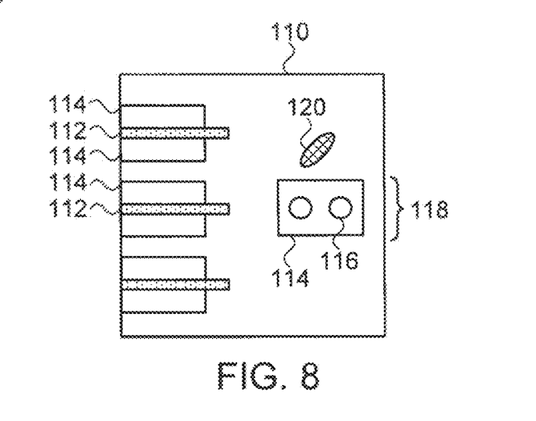
FIG. 8 is a schematic view of a defect in proximity to a multi-layer structure on a semiconductor wafer, in accordance with an embodiment of the present invention.

FIG. 8 is an exemplary schematic top view of a semiconductor wafer 110, showing a defect 120 in proximity to a multi-layer structure 118, in accordance with an embodiment of the present invention. In FIG. 8, elements are formed on the wafer surface in three different layers 112, 114, 116. CAD data enables the operator of an ADC machine to identify multi-layer structure 118, comprising elements in layers 114 and 116, which is of significance for defect analysis. The multi-layer structure 118 can be significant because it is particularly sensitive to nearby defects, particularly defect-prone, etc. In some embodiments, the ADC machine automatically identifies significant multi-layer structures in the CAD data.

Once structure 118 has been identified in the CAD data, the ADC machine is able to compute a structure-specific attribute of defect 120. The ADC machine identifies the corresponding structure in an image that is registered with the CAD data, and then computes the structure-specific attribute based on the spatial relationship of defect 120 to the structure in the image (e.g., overlap percentage attribute, etc.).

Although the embodiments described above relate specifically to defect classification based on SEM images, the principles of the present invention may similarly be applied to defect images acquired by other means, such as optical images. In optical inspection, areas of interest in the image may be identified according to CAD information and may then be scanned with higher detection sensitivity.

Figure 9:
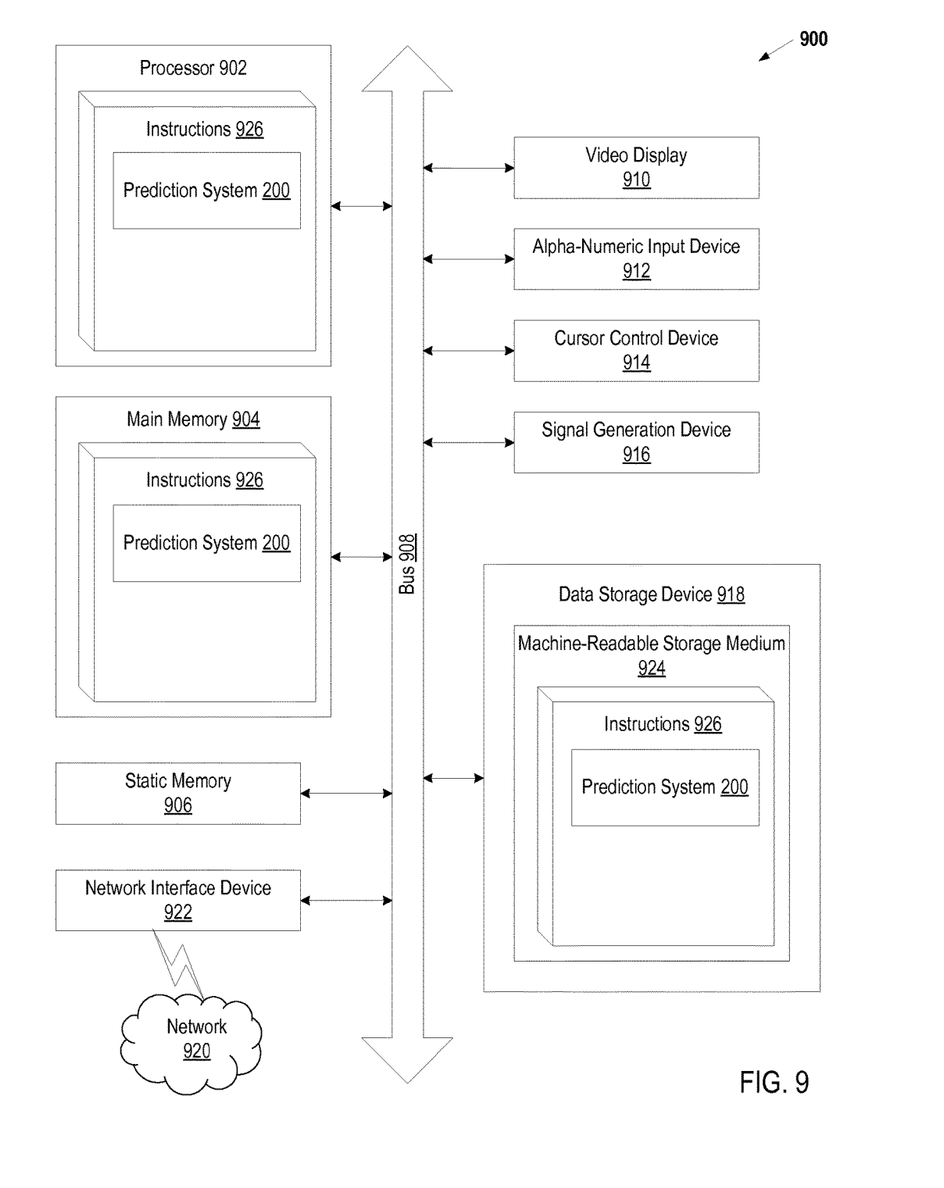
FIG. 9 is a block diagram of an exemplary computer system that may perform one or more of the operations described herein.

FIG. 9 illustrates a diagram of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM), double data rate SDRAM (DDR SDRAM), or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 920 via the network interface device 922.

In one embodiment, the instructions 926 include instructions for defect classification using CAD-based context attributes and/or a software library containing methods that call a module including instructions for defect classification using CAD-based context attributes. In one embodiment, the instructions 926 include instructions for defect classification using CAD-based context attributes and/or a software library containing methods that call instructions for a defect classification using CAD-based context attributes. While the computer-readable storage medium 924 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
    receiving an image of a portion of a semiconductor wafer that includes a defect, the image having been captured by an inspection system;

segmenting the image of the portion of the semiconductor wafer to identify one or more elements of a pattern built on the portion of the semiconductor wafer;

processing, by a processor, the segmented image to calculate a value for an attribute of the defect in the image based on at least one of:

an extent of overlap between the defect and at least one of the identified elements of the pattern;

a number of identified elements of the pattern intersected by the defect; and a gray level value indicative of a gray level of the defect relative to a gray level of at least one of the identified elements of the pattern; and classifying the defect based on the value for the attribute of the defect and an amount of distance between the defect and at least one element of the pattern built on a surface of the portion of the semiconductor wafer that is not in a field of view associated with the image.

2. The method of claim 1, wherein the extent of overlap is selected from the group constituted by: an area of overlap between the defect and at least one of the one or more identified elements of the pattern; an area of overlap between the defect and all identified elements of the pattern; a relationship between an area of at least one identified element and its area overlapped with the defect; and a relationship between an area of all identified elements and their area overlapped with the defect.

3. The method of claim 1, wherein the value for the attribute of the defect is calculated further based on computer-aided design (CAD) data associated with the pattern built on the semiconductor wafer.

4. The method of claim 3, wherein the value for the attribute of the defect is calculated further based on a portion of the CAD data associated with an underlying layer below a surface of the semiconductor wafer.

5. The method of claim 1, wherein the value for the attribute of the defect is calculated further based on a portion of the CAD data associated with at least one element of the pattern that is not in the field of view associated with the image.

6. The method of claim 5, wherein the at least one element of the pattern is in an area of the semiconductor wafer outside the area corresponding to the image of the portion of the semiconductor wafer.

7. The method of claim 1, wherein the value for the attribute of the defect is calculated further based on a spatial relationship between the defect and the at least one of the identified elements of the pattern.

8. The method of claim 1, wherein the segmenting of the image of the portion of the semiconductor wafer is provided using computer-aided design (CAD) data.

9. The method of claim 1, wherein the image of the portion of the semiconductor wafer comprises a scanning electronic microscope (SEM) image.

10. The method of claim 1, wherein the value for the attribute of the defect is calculated further based on a topographical feature of the defect.

11. A system comprising:
a memory; and
a processor, operatively coupled with the memory, to:
receive an image of a portion of a semiconductor wafer that includes a defect, the image having been captured by an inspection system;
segment the image of the portion of the semiconductor wafer to identify one or more elements of a pattern built on the portion of the semiconductor wafer;
process the segmented image to calculate a value for an attribute of the defect in the image based on at least one of:
an extent of overlap between the defect and at least one of the identified elements of the pattern;
a number of identified elements of the pattern intersected by the defect; and
a gray level value indicative of a gray level of the defect relative to a gray level of at least one of the identified elements of the pattern; and
classify the defect based on the value for the attribute of the defect and an amount of distance between the defect and at least one element of the pattern built on a surface of the portion of the semiconductor wafer that is not in a field of view associated with the image.

12. The system of claim 11, wherein the extent of overlap is selected from the group constituted by: an area of overlap between the defect and at least one of the one or more identified elements of the pattern; an area of overlap between the defect and all identified elements of the pattern; a relationship between an area of at least one identified element and its area overlapped with the defect; and a relationship between an area of all identified elements and their area overlapped with the defect.

13. The system of claim 11, wherein the value for the attribute of the defect is calculated further based on computer-aided design (CAD) data associated with the pattern built on the semiconductor wafer.

14. The system of claim 13, wherein the value for the attribute of the defect is calculated further based on a portion of the CAD data associated with an underlying layer below a surface of the semiconductor wafer.

15. The system of claim 11, wherein the value for the attribute of the defect is calculated further based on a portion of the CAD data associated with at least one element of the pattern that is not in the field of view associated with the image.

16. The system of claim 15, wherein the at least one element of the pattern is in an area of the semiconductor wafer outside the area corresponding to the image of the portion of the semiconductor wafer.

17. The system of claim 11, wherein the value for the attribute of the defect is calculated further based on a spatial relationship between the defect and the at least one of the identified elements of the pattern.

18. The system of claim 11, wherein the segmenting of the image of the portion of the semiconductor wafer is provided using computer-aided design (CAD) data.

19. The system of claim 11, wherein the image of the portion of the semiconductor wafer comprises a scanning electronic microscope (SEM) image.

20. The system of claim 11, wherein the value for the attribute of the defect is calculated further based on a topographical feature of the defect.

21. A non-transitory computer readable medium comprising instructions that, when executed by a processor, cause the processor to perform operations comprising:
receiving an image of a portion of a semiconductor wafer that includes a defect, the image having been captured by an inspection system;
segmenting the image of the portion of the semiconductor wafer to identify one or more elements of a pattern built on the portion of the semiconductor wafer;
processing, by the processor, the segmented image to calculate a value for an attribute of the defect in the image based on at least one of:

an extent of overlap between the defect and at least one of the identified elements of the pattern;

a number of identified elements of the pattern intersected by the defect; and a gray level value indicative of a gray level of the defect relative to a gray level of at least one of the identified elements of the pattern; and classifying the defect based on the value for the attribute of the defect and an amount of distance between the defect and at least one element of the pattern built on a surface of the portion of the semiconductor wafer that is not in a field of view associated with the image.

22. The non-transitory computer readable medium of claim 21, wherein the extent of overlap is selected from the group constituted by: an area of overlap between the defect and at least one of the one or more identified elements of the pattern; an area of overlap between the defect and all identified elements of the pattern; a relationship between an area of at least one identified element and its area overlapped with the defect; and a relationship between an area of all identified elements and their area overlapped with the defect.

23. The non-transitory computer readable medium of claim 21, wherein the value for the attribute of the defect is calculated further based on computer-aided design (CAD) data associated with the pattern built on the semiconductor wafer.

24. The non-transitory computer readable medium of claim 23, wherein the value for the attribute of the defect is calculated further based on a portion of the CAD data associated with an underlying layer below a surface of the semiconductor wafer.

25. The non-transitory computer readable medium of claim 21, wherein the value for the attribute of the defect is calculated further based on a portion of the CAD data associated with at least one element of the pattern that is not in the field of view associated with the image.

26. The non-transitory computer readable medium of claim 25, wherein the at least one element of the pattern is in an area of the semiconductor wafer outside the area corresponding to the image of the portion of the semiconductor wafer.

27. The non-transitory computer readable medium of claim 21, wherein the value for the attribute of the defect is calculated further based on a spatial relationship between the defect and the at least one of the identified elements of the pattern.

28. The non-transitory computer readable medium of claim 21, wherein the segmenting of the image of the portion of the semiconductor wafer is provided using computer-aided design (CAD) data.

29. The non-transitory computer readable medium of claim 21, wherein the image of the portion of the semiconductor wafer comprises a scanning electronic microscope (SEM) image.

30. The non-transitory computer readable medium of claim 21, wherein the value for the attribute of the defect is calculated further based on a topographical feature of the defect.

* * * * *